(12) United States Patent
Baumeister et al.

(10) Patent No.: US 6,710,480 B1
(45) Date of Patent: Mar. 23, 2004

(54) ROTATION ANGLE MEASURING DEVICE WITH MAGNETIZED COMMUTATOR

(75) Inventors: Udo Baumeister, Bietigheim-Bissingen (DE); Ronald Frey, Bonnigheim (DE); Eberhard Hogler, Erligheim (DE); Peter Andres, Hoccheim (DE)

(73) Assignee: Valeo Auto-Electric Wischer und Motoren GmbH (DE)

( * ) Notice: Subject to any disclaimer, the term of this patent is extended or adjusted under 35 U.S.C. 154(b) by 0 days.

(21) Appl. No.: 09/622,525

(22) PCT Filed: Feb. 18, 1999

(86) PCT No.: PCT/EP99/01020

§ 371 (c)(1),
(2), (4) Date: Nov. 27, 2000

(87) PCT Pub. No.: WO99/43071

PCT Pub. Date: Aug. 26, 1999

(30) Foreign Application Priority Data

Feb. 21, 1998 (DE) .......................... 198 11 424

(51) Int. Cl.[7] .............................. H02K 11/00
(52) U.S. Cl. ................... 310/68 B; 310/233
(58) Field of Search ............ 310/68 B, 231–236, 310/43; 73/862.336, 862.333

(56) References Cited

U.S. PATENT DOCUMENTS

| | | | | |
|---|---|---|---|---|
| 4,025,808 A | * | 5/1977 | Grengg et al. ............. | 310/67 |
| 5,095,611 A | * | 3/1992 | Smith ........................ | 29/596 |
| 5,256,924 A | * | 10/1993 | Fischer .................... | 310/233 |
| 5,331,257 A | * | 7/1994 | Materne et al. ........... | 318/85 |
| 5,517,067 A | * | 5/1996 | Sata ......................... | 310/68 B |
| 5,565,721 A | * | 10/1996 | Knappe .................... | 310/68 B |
| 5,578,878 A | * | 11/1996 | Hall ......................... | 310/51 |
| 5,621,413 A | | 4/1997 | Lempkowski et al. ..... | 342/117 |
| 5,936,374 A | * | 8/1999 | Haner ...................... | 318/725 |
| 5,949,173 A | * | 9/1999 | Wille et al. ............... | 310/220 |
| 5,962,946 A | * | 10/1999 | Kobman et al. ........... | 310/233 |
| 6,013,961 A | * | 1/2000 | Sakamaki et al. ......... | 310/68 B |
| 6,091,171 A | * | 7/2000 | Ohishi et al. ............. | 310/68 B |

FOREIGN PATENT DOCUMENTS

| | | |
|---|---|---|
| DE | 35 40 426 | 5/1986 |
| DE | 88 11 966.1 | 9/1989 |
| DE | 90 06 935 | 10/1991 |
| DE | 42 29 045 | 8/1992 |
| DE | 42 38 375 | 11/1992 |
| DE | 42 25 653 | 2/1993 |
| DE | 41 29 580 | 3/1993 |
| DE | 43 15 091 | 11/1993 |
| DE | 196 30 764 | 7/1996 |
| DE | 27 48 502 | 5/1997 |
| EP | 359 853 | 3/1990 |
| EP | 0 753 931 | 1/1997 |
| JP | 01 99490 | 8/1989 |
| JP | 01 122386 | 8/1989 |

OTHER PUBLICATIONS

German patent application disclosure, Valeo Schalter und Sensoren GmbH, *Verfahren Zum Messen Der Geschwindigkeit Eines Fahrzeuges*, dated Sep. 11, 2000.

* cited by examiner

*Primary Examiner*—Thanh Lam
(74) *Attorney, Agent, or Firm*—J. Gordon Lewis

(57) ABSTRACT

The invention relates to a rotation angle measuring device for an electrical machine. To provide a simple and compact measuring device of this kind, the invention provides for the commutator of the machine to be magnetized and for the magnetic field which rotates with the commutator to be evaluated by means of a suitable sensor. Advantageous improvements relate to a suitable structure for the commutator.

20 Claims, 1 Drawing Sheet

ROTATION ANGLE MEASURING DEVICE WITH MAGNETIZED COMMUTATOR

BACKGROUND

The invention pertains to a device for measuring the angle of rotation or a value derived therefrom in an electrical machine equipped with a commutator. This machine can be a motor or a dynamo or generator. Essential for the invention is that a commutator is provided that is equipped in a known manner with electrically conductive contacts, via which currents are conducted in temporal sequence that produce a more or less constantly alternating field. Conversely, in the case of a dynamo, the commutator can receive the generated current. The invention can also be used with annular sliding contacts.

It is often desirable to determine the rotary status of the rotor or an angular value for the rotor of an electrical machine derived therefrom without regard as to whether the machine is operated in generator or motor mode. To this end, it is known from DE-OS 41 03 561 that the shaft of a motor can be connected to magnets, with Hall elements provided in the stator associated with these magnets. In DE-OS 35 39 390, magnets are mounted on the shaft of a tachogenerator, the rotary status of which is scanned by an inductive sensor, while a commutator is axially offset on the shaft (see FIG. 1.)

Since the space available in small motors is often very limited, the objective is to integrate the rotary angle measurement device into other components of the electrical machine whenever possible.

SUMMARY

Accordingly, the invention is based on a rotary angle measurement device. In realization of the objective, the invention proposes that the segmented basic body of the commutator be permanently magnetized, at least sectionally, and that the stator of the machine be equipped with a sensor responding to the rotary status of the commutator.

Therefore, the invention consists principally in utilizing the fact that the basic body of a commutator is fully capable of being magnetized without impairment of the primary function of the commutator, namely providing contact of its segments with the contact brushes.

It follows according to the invention that it is readily possible, in addition to the task of current conductivity, to integrate into the commutator the additional formation of a rotating magnetic field.

Inasmuch as a rotating magnetic field is already present in most electric machines, it is theoretically possible to make do without a magnetic field specially integrated into the commutator. However, the magnetic field specially integrated into the commutator is particularly capable of providing a field strength sufficient to activate a Hall element, whereby the Hall element could be located in the stator in the vicinity of the commutator. Of course, a better rotating field measurement can be achieved with several Hall elements. The invention is not limited to the following embodiments. With the measurement device according to the invention, the rotary speed, the rotary acceleration or any other value of the rotor derivable from its rotary status can also be determined.

The segments of the commutator themselves must not be electrically connected via the commutator. This can be realized by enclosing the individual segments in an insulating layer. However, an advantageous modification of the invention is recommended, according to which the basic body consists of an insulating material that is nevertheless so configured that it permits the magnetic flux to pass through the basic body. The basic body preferably consists of plastic. For the positioning of one or more magnets inside the basic body in the commutator in advantageous refinement, a series of measures are available. To this end, at least one prefabricated magnet be fitted into an appropriate recess in the commutator.

However, the basic body can also be molded from a magnetizable, electrically nonconductive material and then permanently magnetized or subjected to a magnetization during the molding process. It is alternatively proposed that the basic body consist of a sintered magnet subjected to a magnetization during or after the sintering process.

The special advantage of the invention lies in the fact that the sensor, especially a Hall sensor, can lie in the same plane as the carbon brushes. This facilitates shortening the length of the motor. The sensors can also be spatially separated farther from the interference suppressors located on the rear end shield of the motor. In this manner, the sensors are rendered less subject to the influence of the suppressors.

BRIEF DESCRIPTION OF THE DRAWINGS

Several preferential embodiments of the present invention are described in greater detail below, with references to the appended drawings. The drawings depict.

DETAILED DESCRIPTION

Figure 1:
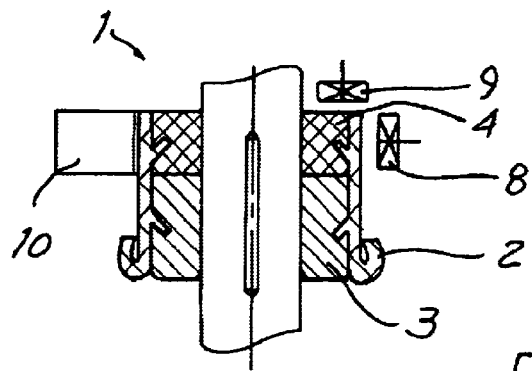
FIG. 1 is a longitudinal cross section view of a commutator of an electrical machine with a device for measuring the angle of rotation according to the invention.

Shown in FIG. 1 is a commutator of an electrical machine. The electrical machine can be a motor or a dynamo (generator). In the case of a motor, the commutator 1 is equipped with electrically conductive contacts in the form of segments 2, via which currents are directed in temporal sequence to one or more rotor coils that produce a more or less constantly alternating magnetic field. Conversely, in the case of a dynamo, the commutator I can serve to receive the generated current.

Figure 3:
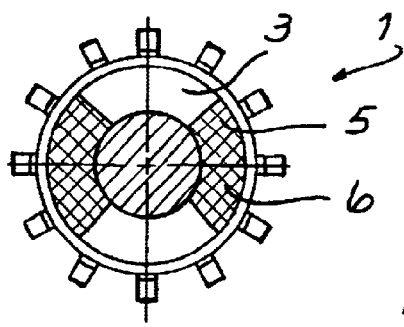
FIG. 3 is a cross section view of the commutator from FIG. 1 in a second embodiment of the invention.

The segments 2 of the commutator 1 consist of an electrically conductive material penetrable by a magnetic field, copper in the present embodiment. The commutator 1 has a basic body 3 bearing the segments 2. The basic body 3 consists of an electrically insulating material that nevertheless permits magnetic flux to pass through the basic body 3 itself. In the case of the embodiments shown in FIGS. 1 and 3, the basic body 3 is made of plastic.

Figure 2:
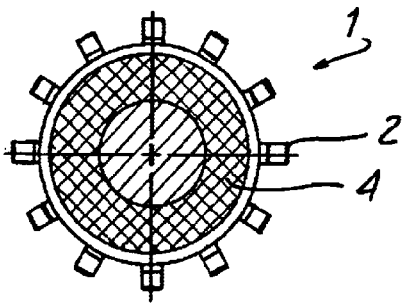
FIG. 2 is a cross section view of the commutator from FIG. 1 in a first embodiment of the invention.
Figure 4:
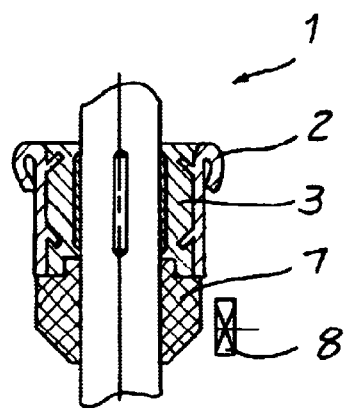
FIG. 4 is a longitudinal cross section of a commutator of an electrical machine with a device for measuring the angle of rotation according to a third embodiment of the invention.

The basic body 3 is sectionally magnetized. The sectional magnetization of the basic body 3 can be accomplished in various ways. In the case of the embodiments in FIGS. 1 and 2, an annular recess is formed in the plastic basic body 3 of the commutator 1, into which an annular magnet 4 is fitted. In the embodiment in FIG. 3, segmented recesses 5 are formed in the plastic basic body 3, into which prefabricated magnetic segments 6 are fitted. Finally, in the embodiment shown in FIG. 4, the entire basic body 3 consists of a magnet made of electrically insulating and magnetizable material. The magnet of the basic body 3 is, for example, molded or sintered. During or following the molding process or sintering process, the magnet is sectionally or completely magnetized. In the case of the embodiment depicted here, the magnetized sections 7 of the basic body 3 are identified.

Located on the stator of the electrical machine are suitable sensors 8, 9, by means of which, in case of a rotary movement of the commutator 1, the rotary status of the commutator 1 or the rotor of the electrical machine is determined from the rotating magnetic field of the magnetized sections 4, 6, 7 of the basic body 3. In the embodiments shown in FIGS. 1–4, the sensors 8, 9 are designed as Hall sensors. Scanning of the magnetic field is accomplished in the radial direction by sensor 8 and in the axial direction by sensor 9. It is feasible to equip the stator with several sensors 8, 9 with the same or different scanning directions. The magnetized sections 4, 6, 7 of the basic body 3 must be magnetized in agreement with the scanning direction of the sensors 8, 9 used.

In addition to the rotary status of the motor, it is also possible, with the device for measuring the angle of rotation according to the invention, to determine the rotary speed, the rotary acceleration or another value of the rotor derived from the rotary status. The advantage of the invention lies particularly in the fact that the sensors 8, 9 can lie in the same plane as the carbon brushes 10 of the electrical machine, as shown in FIG. 1. The constructive length of the electrical machine can be shortened thereby. Similarly, the sensors 8, 9 can be spatially separated farther from the interference suppressors located on the rear end shield of the motor. In this manner, the sensors 8, 9 are rendered less subject to interference from the suppressors.

What is claimed is:

1. A device for measuring the angle of rotation for an electrical machine equipped with a commutator, a stator and carbon brushes, in which segments of the commutator are formed of an electrically conductive material penetrable by a magnetic field of the commutator, characterized in that a basic body of the commutator bearing the segments is permanently magnetized, at least sectionally, and that the stator of the machine equipped with sensors responding to the rotary status of the commutator, wherein at least one of the sensors lies in a radially-extending plane coincident with the carbon brushes.

2. The device for measuring the angle of rotation according to claim 1 characterized in that each sensor has at least one Hall element which is penetrable by the magnetic field of the commutator.

3. The device for measuring the angle of rotation according to claim 1, characterized in that the basic body is made of an electrically insulting material permeable to a magnetic field.

4. The device for measuring the angle of rotation according to claim 3, characterized in that the basic body is made of plastic.

5. The device for measuring the angle of rotation according to claim 1, characterized in that the basic body has at least one recess, into which a prefabricated magnet is fitted.

6. The device for measuring the angle of rotation according to claim 1, characterized in that the basic body is formed of a magnet made of electrically insulating and magnetizable material.

7. The device for measuring the angle of rotation according to claim 5, characterized in that the magnet of the basic body is molded.

8. The device for measuring the angle of rotation according to claim 5, characterized in that the magnet of the basic body is sintered.

9. A device for measuring the angle of rotation for an electrical machine with a shaft and at least one carbon brush, comprising:

a commutator including electrically conductive segments concentrically arranged around a basic body mounted on the shaft wherein the basic body includes at least one magnetized section; and a sensor responding to a magnetic field generated upon rotation of the commutator, wherein the sensor is positionable in a same radially-extending plane as the at least one carbon brush.

10. The device for measuring the angle of rotation according to claim 9, characterized in that the sensor has at least one Hall element penetrable by the magnetic field.

11. The device for measuring the angle of rotation according to claim 10 wherein the sensor is mounted upon a stator of the electrical machine.

12. The device for measuring the angle of rotation according to claim 9 wherein the basic body is made of electrically insulting material permeable to a magnetic field.

13. The device for measuring the angle of rotation according to claim 12 wherein the basic body is made of one of a sectionally-magnetized and a completely magnetized magnet.

14. The device for measuring the angle of rotation according to claim 9 wherein each of the at least one magnetized sections include a magnet mounted in a recess formed in the basic body.

15. The device for measuring the angle of rotation according to claim 14 wherein the basic body is made of plastic.

16. The device for measuring the angle of rotation according to claim 9 wherein the basic body is formed of a magnet.

17. The device for measuring the angle of rotation according to claim 9 wherein the at least one magnetized section is formed of magnatized, electrically insulating material.

18. The device for measuring the angle of rotation according to claim 9 wherein the basic body is an annular plastic body onto which an annular magnet is fitted.

19. The device for measuring the angle of rotation according to claim 9 wherein the basic body has a plurality of segmented recesses, each of the plurality of segmented recesses having a magnetic segment fitted therein.

20. The device for measuring the angle of rotation according to claim 9 wherein the magnetic segments are each formed by one of molding or sintering.

* * * * *